(12) United States Patent
Lisec

(10) Patent No.: US 7,740,525 B2
(45) Date of Patent: Jun. 22, 2010

(54) DEVICE FOR SECURING MATERIAL PLATES, SUCH AS GLASS SHEETS, DURING THE WORKING THEREOF

(76) Inventor: Peter Lisec, Bahnhofstrasse 34, Amstetten-Hausmening (AT) A-3363

( * ) Notice: Subject to any disclaimer, the term of this patent is extended or adjusted under 35 U.S.C. 154(b) by 1073 days.

(21) Appl. No.: 10/488,767

(22) PCT Filed: Dec. 5, 2002

(86) PCT No.: PCT/AT02/00342

§ 371 (c)(1),
(2), (4) Date: Sep. 14, 2004

(87) PCT Pub. No.: WO2004/050516

PCT Pub. Date: Jun. 17, 2004

(65) Prior Publication Data

US 2005/0011229 A1    Jan. 20, 2005

(51) Int. Cl.
*B24B 41/06* (2006.01)
(52) U.S. Cl. .................................. 451/364; 451/44
(58) Field of Classification Search ................ 451/178, 451/44, 57, 65, 364–414; 65/174, 175, 182.1, 65/182.2
See application file for complete search history.

(56) References Cited

U.S. PATENT DOCUMENTS 4,495,023 A * 1/1985 Lisec .......................... 156/562

| 4,716,686 A | * | 1/1988 | Lisec ..................... 451/184 |
| 5,003,729 A | * | 4/1991 | Sherby ................... 451/38 |
| 6,220,056 B1 | * | 4/2001 | Ostendarp ............... 65/175 |
| 6,222,155 B1 | * | 4/2001 | Blackmon et al. ...... 219/121.39 |
| 2001/0018313 A1 | | 8/2001 | Lisec |

FOREIGN PATENT DOCUMENTS

| CN | 1186763 | 7/1998 |
| DE | 198 06 306 | 9/1999 |
| EP | 1449619 A1 * | 8/2004 |

OTHER PUBLICATIONS

CN Office Action dated Apr. 18, 2008 from corresponding CN02820423.9.

* cited by examiner

*Primary Examiner*—Dung Van Nguyen
(74) *Attorney, Agent, or Firm*—Young & Thompson

(57) ABSTRACT

A device for working of material plates (1), such as glass panes, has a supporting member (25, 26, 29) for the material plate (1) and a tool (12, 18) for working the material plates (1). The supporting member (25, 26, 29) has paired supporting elements (25', 25", 26', 26", 29', 29") with supporting surfaces (27', 27", 30', 30") facing one another, between which the material plate (1) is held. There are openings (31) for liquid emerging under pressure in the supporting surfaces (27', 27", 30', 30"). The material plate (1), especially the glass pane, is therefore not mechanically supported, as is conventional in the prior art, but uses a liquid film which is formed under pressure in the gap between the material plate (1) and the supporting surfaces (27', 27", 30', 30") of the supporting elements (25', 25", 26', 26", 29', 29").

20 Claims, 4 Drawing Sheets

DEVICE FOR SECURING MATERIAL PLATES, SUCH AS GLASS SHEETS, DURING THE WORKING THEREOF

FIELD OF THE INVENTION

The invention relates to a device for working of material plates, such as glass panes, with a supporting means for the material plate and with a tool for working the material plates.

BACKGROUND OF THE INVENTION

Supporting means for material plates, especially glass panes, are known in the prior art as roller tables, drum tables, or air cushion walls, especially as part of insulating glass production plants. As long as especially high forces are not applied to the material plate (glass pane) during working, the supporting action of these supporting means is rather high. But it is a problem when high forces are applied normally to the plane of the plate during working or the material plates are caused to vibrate during working, since in these cases it is necessary to hold or clamp the material plate securely. This however entails the danger on the one hand that the material plates, such as glass panes, when held or clamped securely, will be scratched, and on the other they cannot be moved or can only be moved with relatively high effort relative to the supporting means.

OBJECT OF THE INVENTION

Therefore the object of the invention is to devise a device of the initially mentioned type in which both high supporting forces can be applied by the supporting means and also relative motion between the supporting means and the material plate to be worked is possible.

SUMMARY OF THE INVENTION

In the invention the material plate, especially the glass pane, is not mechanically supported, as is conventional in the prior art, but uses a liquid film which is formed under pressure in the gap between the material plate and the supporting surfaces of the supporting elements. This gap can be very small, for example 1 mm, so that relatively precise guidance of the material plate between the supporting elements is possible without mechanical contact between the material plate and the supporting surfaces occurring even with high contact pressure forces or stronger vibrations. At the same time however it is ensured that the material plate can be pushed between the supporting surfaces. To the extent vibrations are involved both in the high frequency and also low frequency range with larger or smaller amplitudes which occur preferably when the material plates are being ground, it has been found that the liquid film has an outstanding vibration damping function. In this way both high surface quality and also higher grinding output can be achieved.

The supporting means as claimed in the invention is used preferably in conjunction with conventional supporting walls which can be made as roller tables, drum tables, or air cushion walls. The supporting means as claimed in the invention in this case is only located in those areas which are close to the tool. But it goes without saying that the supporting means as claimed in the invention can also be used alone.

Within the framework of the invention, it is possible for the supporting elements to be located in the immediate area next to the tool. It is possible for example for the supporting elements to be made essentially annular and to surround the tool. This ensures an outstanding supporting action in the immediate vicinity of the tool where the greatest load occurs.

Alternatively or in addition it is however also possible for there to be at least one pair of supporting elements which extend in the manner of a beam preferably over the entire width of the material plate. In this way the material plate, especially a glass pane, can be supported over a large area, its also being possible, as mentioned, to provide an additional supporting means in addition in the immediate area next to the tool.

BRIEF DESCRIPTION OF THE DRAWINGS

Other features and advantages of the invention derive from the following description of preferred embodiments of the invention with reference to the drawings.

DETAILED DESCRIPTION OF THE INVENTION

Figure 1:
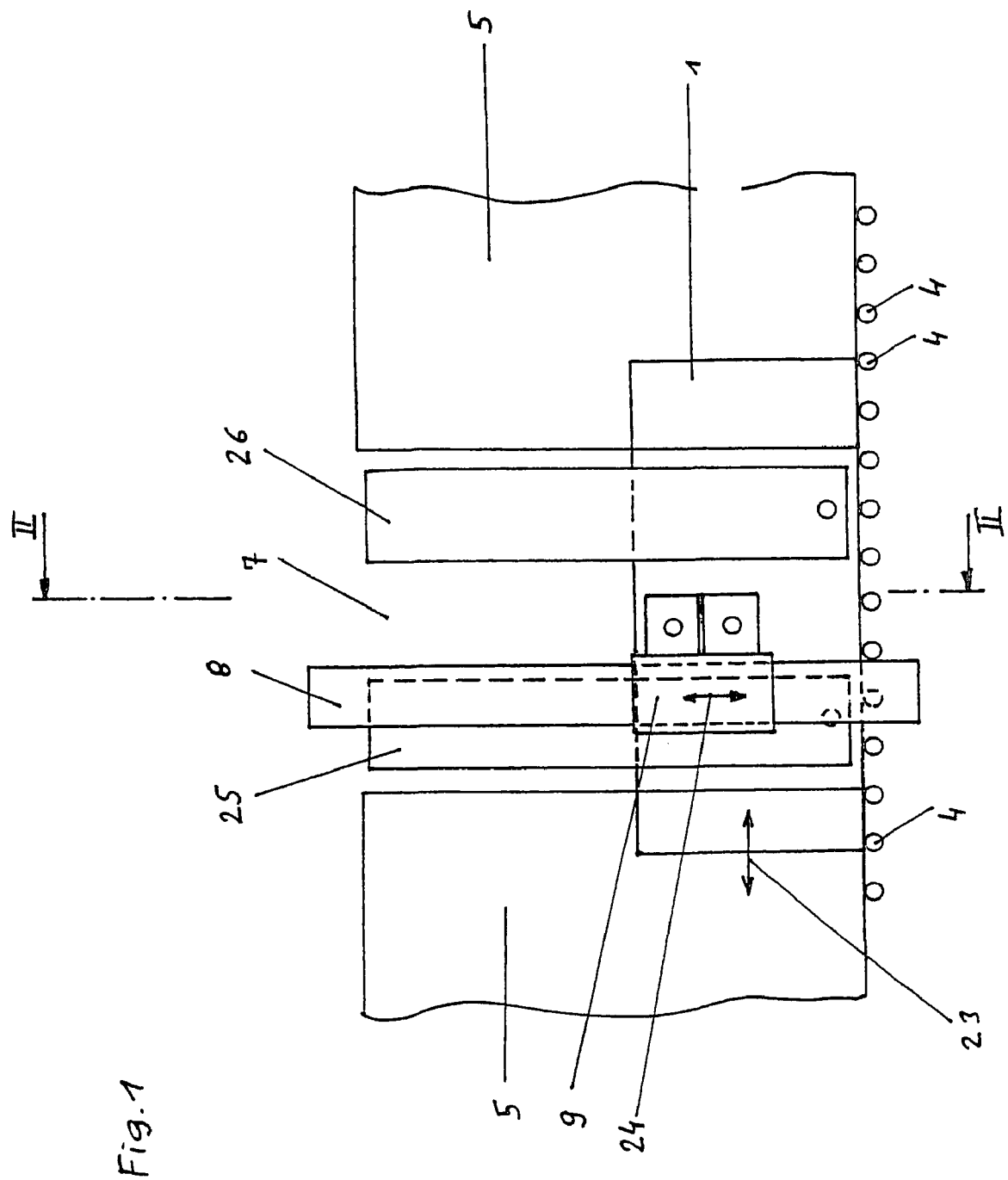
FIG. 1 shows a front view of one embodiment of a device as claimed in the invention.
Figure 2:
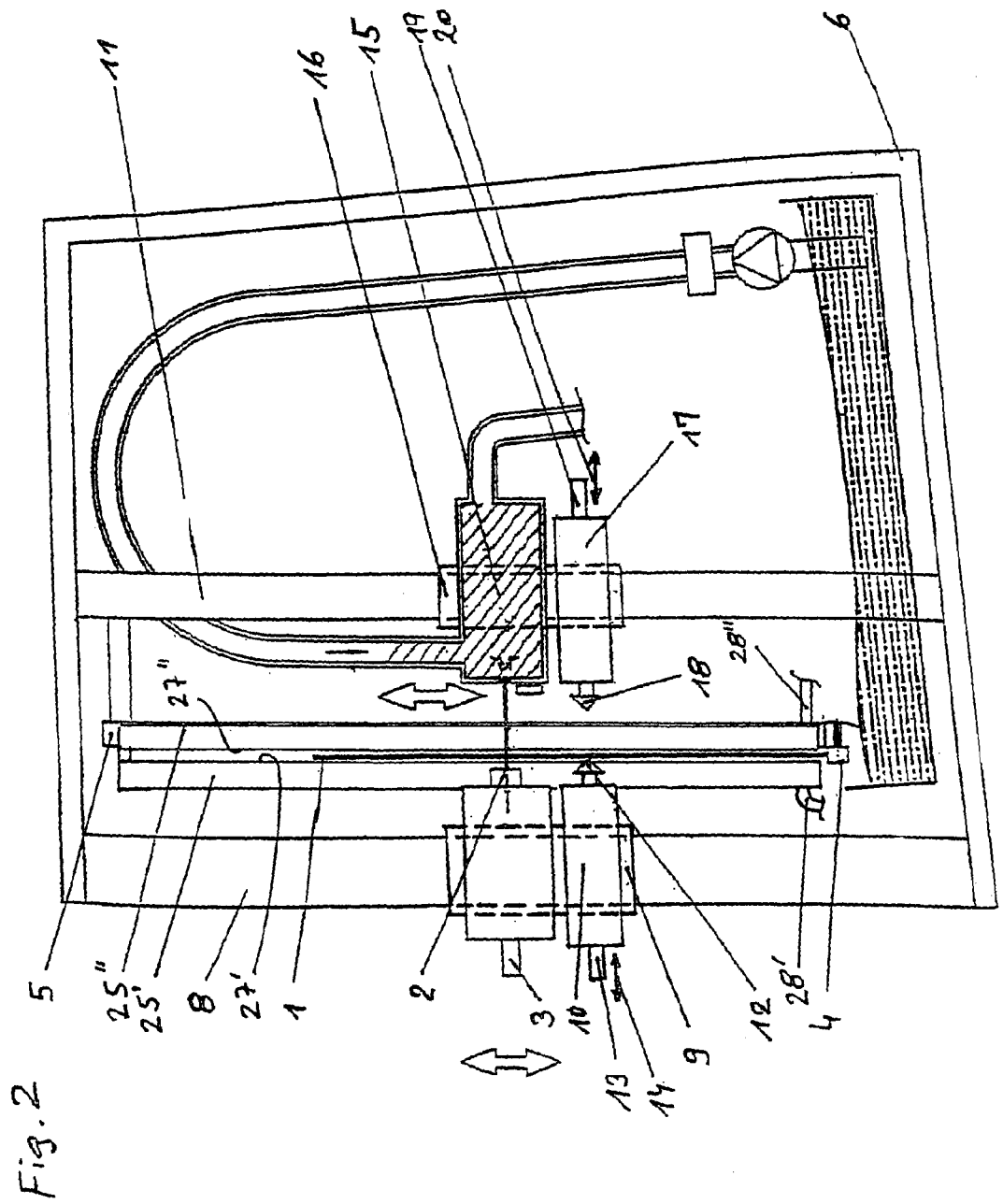
FIG. 2 shows a section through the device from FIG. 1 along line II-II.

FIGS. 1 and 2 show a device as claimed in the invention in which a material plate, for example a glass pane 1, standing roughly vertically, adjoins a support wall 5. The support wall 5 is located on a machine frame 6. The glass pane 1 stands on a horizontal conveyor which in the embodiment shown is formed by transport rollers 4. In the prior art these support walls 5 are known for example as roller tables, drum tables, or air cushion walls, especially as part of insulating glass production plants. The same applies to the most varied embodiments of horizontal conveyors.

The support wall 5 is interrupted by a recess in the form of a vertically running slot 7. In the area of the slot 7, in front of and behind the support wall 5 there are vertically aligned guides 8 and 11. On the guide 8 which is located in front of the support wall 5, i.e. on the side of the support wall 5 adjoining the glass pane 1, a nozzle 2 can be moved which is supplied via a connection 3 with water under high pressure to which abrasive particles can be added, from a conventional high pressure pump which therefore is not described. Cuts of any configuration can be produced in the pane 1 by the water jet by successive or simultaneous movement of the nozzle 2 on the guide 8 and movement of the glass pane 1 along the horizontal conveyor 4.

The nozzle 2 can be moved on a carriage 9 on the guide 8. On this carriage 9 there is furthermore a drive 10 for a tool 12 which has a grinding cone in the embodiment shown in FIG. 2. The tool 12 is mounted on a tool spindle 13 which can be moved back and forth along the double arrow 14. Using the tool 12 for example round recesses produced with the nozzle 2 or the water jet can be countersunk. Instead of a grinding cone however grinding wheels or polishing wheels for reworking the cut edges can be mounted on the tool spindle 13.

On the guide which is located on the back of the support wall 5 there is a water-filled chamber 15 which the water jet enters in order to prevent unwanted spray mist formation, reflection of the water jet with the abrasive particles onto the back of the glass pane 1, and unwanted noise development. The water-filled chamber 15 can be moved back and forth synchronously with the nozzle on a carriage 16. Furthermore a second drive 17 for the second tool 18 is attached to the carriage 16, and the tool 18 in turn can be moved back and forth on the spindle 19 in the direction of the double arrow 20. With the tool 18, as with the tool 12, from the back for example openings can be countersunk or edges which run in any way can be ground. Instead of the grinding cone 18 in turn for example grinding wheels or polishing wheels can be used. The chamber 15 and the tool 18 are attached to a common carriage 16 which can be moved on the guide 11.

As is shown for example in FIG. 1, the glass plate 1 can be moved along the horizontal conveyor 4 during working in the direction of the double arrow 23. In this way for example horizontally running cuts can be produced or worked. If at the same time the carriage 9 is moved up and down along the double arrow 24, obliquely running cuts or cuts of any curvature or for example round cutouts can also be produced and worked.

In this working and especially in grinding of the edges the glass pane 1 is exposed to very high stress, especially the vibrations arising in this case having a very adverse effect since, aside from the fact that the glass pane 1 can break, they make clean grinding of the cut edges impossible and moreover the glass pane 1 could be damaged or scratched due to the circumstance that it adjoins the support wall 5 under high frequency vibrations. The development of noise is likewise disturbing.

To prevent this, in the embodiment shown in FIG. 1 and FIG. 2 there are two pairs of beam-shaped supporting means 25 and 26. Each supporting means 25 and 26 consists of two supporting elements 25', 25" and 26', 26", the glass pane 1 being held between their facing supporting surfaces 27', 27". In the supporting surfaces 27', 27" openings which are not shown in the drawings are made. These openings are connected to feed lines 28', 28" through which a liquid, for example water, is supplied under a pressure for example of 20 bar. The beam-shaped support elements 25', 25" and 26', 26' can be made hollow, for example, so that the feed lines 28', 28" are directly connected to the openings. The liquid emerging from the openings forms, between the supporting surfaces 27', 27" and the material plate 1, a liquid film or a liquid layer which almost completely prevents motion or vibration of the glass pane 1 at a right angle to the plane of the material plate 1 or the supporting surfaces 27', 27", but allows displacement of the material plate 1 in the direction of the plane of the plate.

Figure 3:
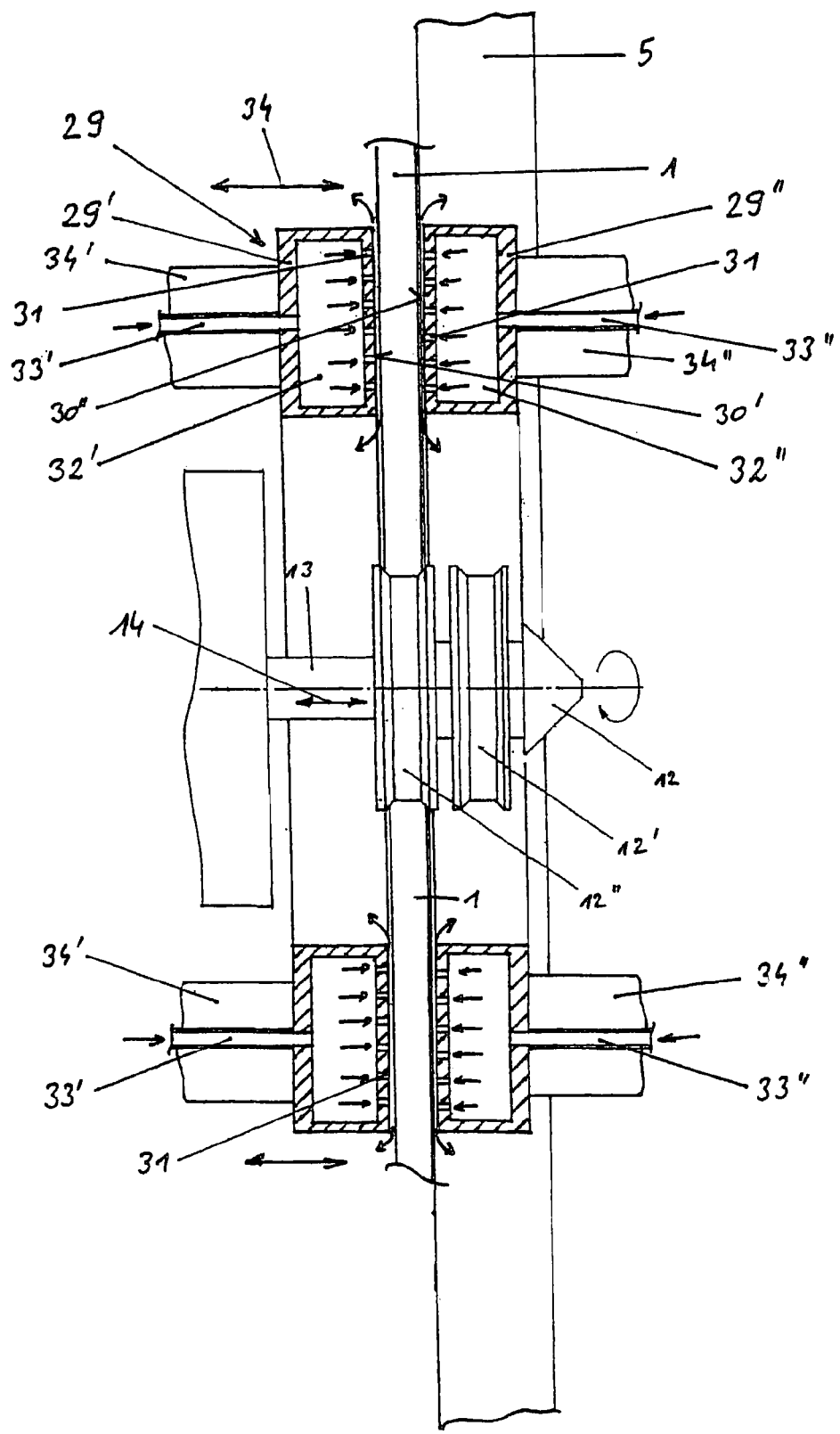
FIG. 3 shows a schematic detailed view of another embodiment of the invention and FIG. 4 shows a schematic oblique view of the embodiment from FIG. 3.

FIG. 3 shows one embodiment of the device as claimed in the invention in which a tool which consists of a combination of a grinding cone 12, a grinding wheel 12', and a polishing wheel 12" is surrounded by an annular supporting means 29. The annular supporting means 29 consists of a pair of annular supporting elements 29', 29", the glass pane 1 being held between their supporting surfaces 30', 30". In the supporting surfaces 30', 30" there are openings 31 which are distributed regularly over the entire supporting surfaces 30', 30". The openings 30 are connected to annular cavities 32', 32" which are supplied via lines 33', 33" with liquid under high pressure. In FIG. 3 there are two lines 33', 33" at a time, but of course only one line 33', 33" per supporting element 29', 29" can also be sufficient.

The supporting elements 29', 29" are connected via holding devices 34', 34" to the carriages 9, 16 of the front guide 8 and the rear guide 11 so that they are concomitantly moved synchronously with the tools 12 and 18 when they are pushed up and down on the guides 8 and 11.

In order to be able to match the supporting means 29 to different thicknesses of glass panes 1, the front supporting element 29' is adjustable in the direction of the double arrow 34, by which it is ensured that the gap between the supporting surfaces 30' and 30' and the glass pane 1 always has a certain width which in conjunction with the liquid pressure which can be adapted as necessary has a relatively high supporting action for the glass pane 1.

In a corresponding manner the front, beam-shaped supporting elements 25', 26' in the embodiment as shown in FIGS. 1 and 2 are adjustable in order to be able to set the gap width between the supporting elements and the glass pane.

The rear supporting elements 25", 26", 29" need not be adjustable normally to the plane of the pane since they are optimally aligned with reference to the supporting surface of the support wall 5. Adjustability as in the front supporting elements 25', 26', 29' is however fundamentally conceivable.

Figure 4:
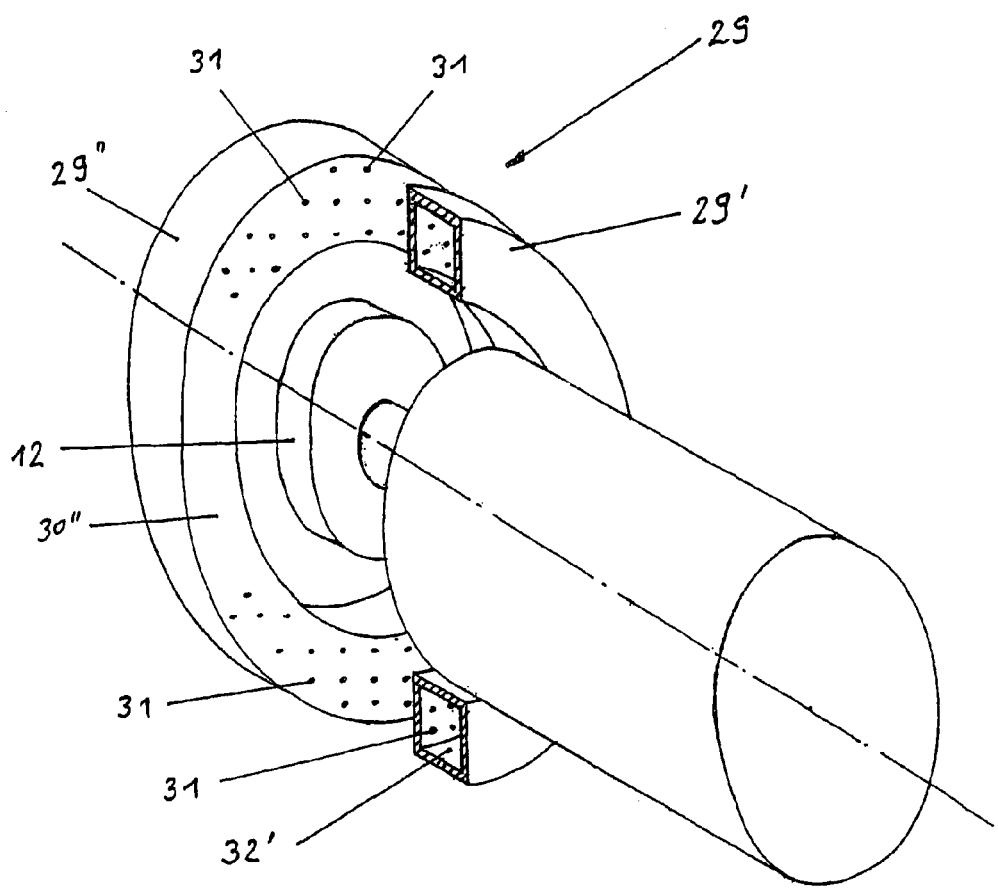

FIG. 4 shows an oblique view of the embodiment from FIG. 3 in which however only the supporting elements 29' and 29" and a tool 12 can be seen.

The magnitude of the delivery output of the pump for the liquid and the diameter and number of holes 31 in the supporting elements 25, 26 and 29 are dimensioned such that the pressure in the gap between the supporting surfaces and the glass pane is always so high that a sufficient supporting action is developed even if a larger number of openings is not covered by the glass pane 1. This can be the case especially in the execution of the supporting elements 25, 26 as shown in FIG. 1 and 2 when the glass pane 1 does not reach the full height of the supporting elements 25, 26, by which the openings in the upper area of the supporting elements are not covered. But of course it can also happen in the embodiment shown in FIG. 3 that some of the openings 11 are not covered by the glass pane 1 when for example areas of the glass pane 1 which have been cut out or off in a straight line are located in front of the openings 31.

In order to prevent an overly high pressure drop, or to obviate the necessity of using a greatly oversized pump for the liquid, when larger or very large areas of the supporting elements or supporting surfaces 27', 27" or 30', 30" are not covered by the glass pane 1, it can also be provided that the chambers of the supporting elements 25, 26, 29 are divided into two or more sections which are supplied with liquid via separate pressure circuits. This ensures that the sections of the supporting surfaces 27', 27" and 30', 30", which sections are covered sufficiently or completely by a glass pane 1, are exposed to the full pressure even if in the other surface areas due to lack of covering by the glass pane 1 a pressure drop occurs. For example the cavities 32', 32" in FIG. 3 can be divided by the horizontal partition into top and bottom component sections which are each supplied separately with liquid via the pressure lines 33', 33".

The liquid for the invention can be water or another liquid which is optionally mixed with water. Thus for example a coolant can be used as the liquid when the tool is a grinding tool in order to be able to dispense with special cooling of the grinding tool for example at lower grinding outputs and to form additional cooling at higher grinding outputs.

The invention claimed is:

1. A device for working of material plates (1), comprising:
   a supporting device(25, 26, 29) for the material plate (1); and
   a tool (12, 18) for working the material plates (1),
   wherein the supporting device (25, 26, 29) has paired supporting elements (25', 25", 26', 26", 29', 29") with supporting surfaces (27', 27", 30', 30") facing one another, between which the material plate (1) is held, and that there are openings (31) for liquid emerging under pressure in the supporting surfaces (27', 27", 30', 30"), and means for delivering liquid under pressure to said openings.

2. The device as claimed in claim 1, wherein the supporting elements (29', 29") are located in the immediate area next to the tool (12).

3. The device as claimed in claim 2, wherein the supporting elements (29', 29") are made essentially annular and surround the tool (12).

4. The device as claimed in claim 1, wherein there is at least one pair of supporting elements (25, 26) which extend in the manner of a beam over at least part of the material plate (1), or over an entire extension of the material plate (1).

5. The device as claimed in claim 4, wherein there are two pairs of beam-shaped supporting elements (25, 26) which are located on either side of the tool (12).

6. The device as claimed in claim 1, wherein there is a support wall (5), a plane of the support wall is tilted slightly relative to the vertical, in an area of a lower edge of the support wall (5) there is a horizontally aligned conveyor element (4) for the material plates (1), and wherein in the support wall (5) there is a roughly vertically arranged recess (7) in which at least one supporting device (25, 26, 29) is located.

7. The device as claimed in claim 6, wherein in an area of the recess (7) there is a roughly vertically aligned guide (8, 11) on which the tool (12, 18) and the supporting device (29) can be moved.

8. The device as claimed in claim 7, wherein in front of and behind the support wall (5) there is a guide (8, 11) on which the tool (12, 18) and/or the supporting elements (29', 29") can be moved synchronously to one another.

9. The device as claimed in claim 1, wherein the tool has means for grinding or polishing.

10. The device as claimed in claim 1, wherein the tool has a nozzle (2) for cutting the material plate (1) by a water jet.

11. The device claimed in claim 1, wherein at least one supporting element (25', 26', 29') of the supporting device (25, 26, 29) can be moved at a right angle to the plane of the material plate (1).

12. The device as claimed in claim 1, wherein the supporting elements (25', 26', 29') have cavities (32', 32") which are connected to the openings (31) and which are connected to pressure fluid lines (28', 28", 33', 33") for the liquid.

13. The device as claimed in claim 12, wherein the cavities (32', 32") are divided into at least two separate sections which are connected to connections (33', 33") for liquid which are independent of one another.

14. A device for working a material plate (1), comprising:
supports (25, 26, 29) for the material plate (1); and
a tool (12, 18) for working the material plate (1),
wherein
the supports (25, 26, 29) have paired supporting elements (25', 25", 26', 26", 29', 29") with supporting surfaces (27', 27", 30', 30") facing one another, between which the material plate (1) is held,
there are openings (31) for liquid emerging under pressure in the supporting surfaces (27', 27", 30', 30"), and
a device for delivering liquid under pressure to said openings.

15. The device as claimed in claim 14, wherein the supporting elements (29', 29") are located in an immediate area next to the tool (12).

16. The device as claimed in claim 15, wherein the supporting elements (29', 29") are made essentially annular and surround the tool (12).

17. The device as claimed in claim 14, wherein there is at least one pair of supports (25, 26) which extend in the manner of a beam over at least part of the material plate (1), or over an entire extension of the material plate (1).

18. The device as claimed in claim 17, wherein there are two pairs of beam-shaped supporting elements (25, 26) which are located on either side of the tool (12).

19. The device as claimed in claim 14, wherein there is a support wall (5), and a plane of the support wall is tilted slightly relative to the vertical, in an area of a lower edge of the support wall (5) there is a horizontally aligned conveyor (4) for the material plates (1), and
in the support wall (5) there is a roughly vertically arranged recess (7) in which at least one of the supports (25, 26, 29) is located.

20. The device as claimed in claim 19, wherein in an area of the recess (7) there is a roughly vertically aligned guide (8, 11) on which the tool (12, 18) and the support (29) can be moved.

* * * * *